United States Patent [19]
Kersten

[11] 4,103,987
[45] Aug. 1, 1978

[54] DEVICE FOR CONNECTING TWO GROUPS OF GLASS FIBERS

[75] Inventor: Ralf Kersten, Rottach-Egern, Fed. Rep. of Germany

[73] Assignee: Siemens Aktiengesellschaft, Berlin & Munich, Fed. Rep. of Germany

[21] Appl. No.: 635,276

[22] Filed: Nov. 26, 1975

[30] Foreign Application Priority Data

Nov. 29, 1974 [DE] Fed. Rep. of Germany ....... 2456552

[51] Int. Cl.² .............................................. G02B 5/14
[52] U.S. Cl. .................................................. 350/96.21
[58] Field of Search ............................ 350/96 C, 96 B

[56] References Cited
U.S. PATENT DOCUMENTS

| | | | |
|---|---|---|---|
| 3,455,625 | 7/1969 | Brumley et al. | 350/96 C |
| 3,910,678 | 10/1975 | McCartney et al. | 350/96 C |
| 3,914,015 | 10/1975 | McCartney | 350/96 C |
| 3,917,383 | 11/1975 | Cook et al. | 350/96 C |
| 3,958,861 | 5/1976 | Roberts | 350/96 C |

FOREIGN PATENT DOCUMENTS 2,347,408  4/1974  Fed. Rep. of Germany ......... 350/96 B

*Primary Examiner*—John K. Corbin
*Assistant Examiner*—Rolf Hille
*Attorney, Agent, or Firm*—Hill, Gross, Simpson, Van Santen, Steadman, Chiara & Simpson

[57] ABSTRACT

A device for forming a connection between a first and second group of glass fibers with each fiber of the first group being held in alignment with a given fiber of the second group characterized by an elongated carrier member having longitudinally extending grooves and a shrinkable tube telescopically received on the elongated member. In forming the connection, the glass fibers of one group are inserted individually in separate grooves from one end of the carrier member and the fibers of the second group are inserted from an opposite end until their end faces abut and engage the end faces of the respective fiber of the first group. After insertion, the tube is shrunk such as by a heat shrinking step so that the fibers are tightly and firmly held in their respective grooves by the shrinkable tube.

11 Claims, 3 Drawing Figures

DEVICE FOR CONNECTING TWO GROUPS OF GLASS FIBERS

BACKGROUND OF THE INVENTION

Field of the Invention

The present invention relates to a device for making a connection between a first and a second group of fibers with each fiber of the first group in alignment with an assigned fiber of the second group, a connection formed by the device and the method of forming the connection.

SUMMARY OF THE INVENTION

The present invention is to provide a simple connection of two groups of glass fibers which has an unlimited number of assignable glass fibers. To accomplish this task, the present invention provides a device for connecting the two groups of fibers, a method of forming a connection between the two groups and the connection. To accomplish these tasks, the device for connecting has an elongated member which has a plurality of longitudinally extending grooves which are of a size and dimension to receive a portion of a fiber such as a glass fiber. The device includes a shrinkable tube, preferably of a heat shrinkable material, which is telescopically received on the elongated member. With this device, the fibers of the first group are inserted into the separate grooves from one end of the carrier member and the fibers from the second group are inserted into respective grooves of the opposite end and until their end surfaces engage the end surfaces of the fibers of the first group. After the insertion or assembly of the fibers in the grooves, the shrinkable tube is shrunk into tight engagement onto the carrier member and the fibers in the groove to hold the fibers in a stable condition in their aligned position.

Preferably, after inserting the fibers of the first group into the one end of the longitudinal grooves with one fiber being disposed in each groove, the method includes the steps of shrinking an end zone of the tube into engagement with the fibers of the first group, then inserting the fibers of the second group into the grooves from the opposite end with one fiber disposed in each groove and its end face being in contact with the end face or surface of the fiber of the first group, shrinking the opposite end of the tube into engagement with the inserted fibers of the second group and subsequently shrinking the tube over its remaining region onto the carrier member and the fibers disposed in the grooves therein. Preferably, the shrinkable tube is a tube of heat shrinkable material and the steps of shrinking comprise heating the tube to cause the tube to shrink onto the carrier member.

Preferably, the shrinkable tube is a transparent material which enables seeing whether the end surfaces of the fibers of the two groups are in contact with each other. If desired, an optical cement may be inserted between the end surfaces of the two groups of fibers which are optical glass fibers to ensure a good optical connection between the aligned optical glass fibers.

The carrier member may be a metal member which enables forming an electrical connection between two wires even though the wires are not touching each other. The carrier member also preferably has conical end portions to prevent or minimize breaking of the fibers extending from the device.

DESCRIPTION OF THE PREFERRED EMBODIMENT

Figure 1:
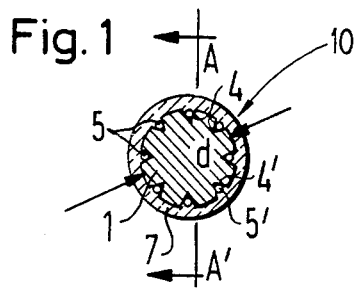
FIG. 1 is a transverse cross section through a connection formed by the device of the present invention.
Figure 2:
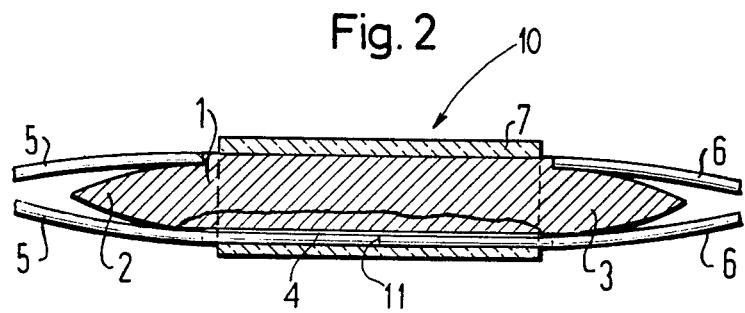
FIG. 2 is a longitudinal cross section taken along lines A-A' with portions broken away and in elevation for purposes of illustration.

The principles of the present invention are particularly useful when incorporated in a connection generally indicated at 10 in FIGS. 1 and 2 between a first group of individual fibers 5 and a second group of individual fibers 6.

To form the connection 10, a device, which comprises an elongated carrier member 1 and a shrinkable sleeve 7, is used. The carrier member 1 is preferably a metal body with end portions 2 and 3 which are conical and converge to a point. The member 1 is provided with a plurality of circumferentially spaced, longitudinally extending grooves 4 (FIG. 1). Each of the grooves 4 have side walls which, as they extend radially outward from the center of the member 1, diverge to provide a V-shaped groove or a groove having a triangular cross-sectional configuration. The depth of each of the grooves 4 amounts to not more than double the radius of the glass fiber which is to be received therein. Due to the triangular configuration, the fiber 5 of the first group and a fiber 6 of the second group which are in one groove will be held in aligned position relative to each other. To improve the optical connection between the engaged end faces 11 (FIG. 2) of the aligned fibers 5 and 6, an optical cement such as an epoxy resin may be placed between the end faces of the fibers disposed in each of the grooves 4.

The internal diameter of the shrinking tube 7 is smaller than the sum of the diameter $d$ of the carrier body 1 (FIG. 1) and the diameter of a glass fiber such as 5 or 6. With the sleeve 7 being shrunk onto the member 1, it tightly engages the periphery of the carrier member 1 and the fibers 5 and 6 to hold the fibers tightly against the side walls of their respective grooves and therefore, in their aligned position.

In FIG. 1, the fiber 5' is an electrical wire or conductor which is inserted into a groove 4'. Since the carrier member 1 is preferably a metal body of electrical conducting material, the incoming and outgoing electrical wires which are inserted in opposite ends of groove 4', do not need to touch one another to form an electrical connection, but form their electrical connection by virtue of their contact with the member 1 and its conductivity.

Figure 3:
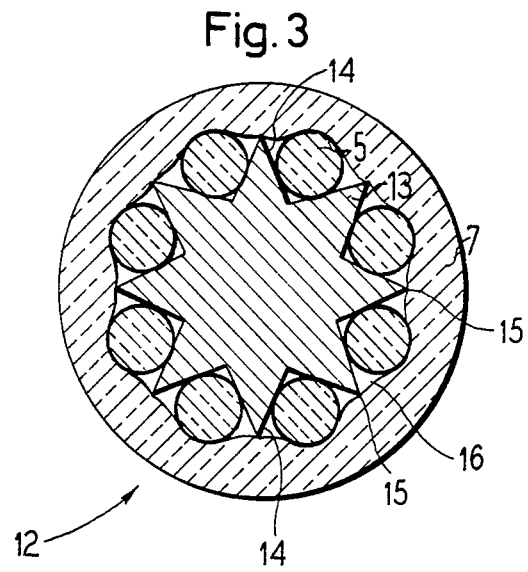
FIG. 3 is a transverse cross section of a connection formed by an embodiment of the device of the present invention.

In the embodiment of FIG. 1, the body 1 is substantially a cylindrical body having the circumferentially spaced grooves 4. The elongated body may have other shapes such as the shape of a polygon and an embodiment of the device is illustrated in FIG. 3 and generally indicated at 12. The device 12 has an elongated member 13 which has a star-shape cross section which enables the number of longitudinally extending grooves 14 separated by edges 15 to be increased for a given diameter of the member 13 or the same number of grooves can be provided with the member 13 having a smaller diameter and therefore provide a savings of material. As illustrated, the grooves 14 have a triangular cross section so that the fibers such as 5 are wedged against the side walls of each of the grooves. The shrinkable sleeve 7 after being shrunk onto the member 13 and the fibers such as 5 will hold the fibers tightly against the side walls of their respective groove and therefore hold them in an aligned stable position with the fibers of the second group. Due to the star-shaped cross section of the body 13, the inner surface of the tube 7 engages the edges 15 and the outer surface of the fibers 5 and leave gaps 16 adjacent each edge 15.

The preferred method of forming a connection with either the device 10 or 12 is as follows. The first two steps of the method are to provide a connecting device having an elongated carrier member having a plurality of longitudinally extending grooves and a tube of shrinkable material, and to telescopically assemble the carrier member within the tube. After insertion or assembly of the carrier member within the tube, the fibers of either one of the groups such as the first group are inserted into one end of the longitudinal grooves with one fiber being disposed in each groove. To hold the inserted fibers, the end zone of the tube is preferably shrunk into engagement therewith. The second group of fibers are then inserted into the opposite end of the grooves with one fiber being disposed in each group and inserted into the groove until the end face of the fiber contacts the end face or surface of the fiber of the first group to form the junction 11. Then the end margin of the sleeve 7 is shrunk at the opposite end to engage and hold the inserted fibers of the second group. Subsequently, the remaining portion of the shrinkable tube 7 is shrunk onto the elongated member to hold all the fibers in their aligned position. Preferably, the material forming the sleeve 7 is a transparent material which enables observing whether the ends are engaged during the step of inserting and preferably this transparent material is a heat shrinkable material so that the various steps of shrinking may be accomplished by heating the zones of the sleeves that are desired to be shrunk into tight engagement with the elongated member and the fibers or wires which are inserted in the grooves.

While both the embodiments of FIGS. 1 and 3 show each of the grooves receiving fibers or at least a wire such as 5', it is possible that the connection could be used for forming the connection between two groups of fibers having less fibers than the number of grooves. The shrinkable tube such as 7 will provide tight engagement for any fiber received in the groove regardless of whether the remaining grooves have fibers inserted therein.

An example of the heat shrinkable material, which is transparent and which may be used for the sleeve 7 illustrated in FIGS. 1 or 3 is polyvinylchloride. As mentioned above, this sleeve can be dissolved by using $CCl_4$ and will enable disassembly of the connection when desired.

If it is necessary or desirable to separate the various glass fibers, the shrinking tube can be removed by a suitable solvent for example $CCl_4$ and the optical cement which is joining the end faces of the fibers can be liquefied by heating.

Although various minor modifications may be suggested by those versed in the art, it should be understood that I wish to employ within the scope of the patent granted hereon, all such modifications as reasonably and properly come within the scope of my contribution to the art.

I claim:

1. A connection between a first and second group of fibers with each group having the same number of fibers, each fiber in the first group being aligned with a given fiber in the second group, said connection comprising a single elongated carrier member having a plurality of longitudinally extending grooves with at least one groove for each fiber of the first group, each groove having a dimension and shape to receive a portion of a fiber disposed therein, said fibers of the first group being arranged with an end portion of each fiber extending into its respective groove from one end, the fibers of the second group being arranged with the end portion of each fiber extending into its respective groove from an opposite end of the groove and with the end surface of the fiber engaging an end surface of the fiber of the first group, and a shrinking tube surrounding the carrier member and fibers disposed in the grooves and tightly engaging both the carrier member and fibers to hold the fibers in a stable and aligned position within their respective grooves.

2. A connection according to claim 1, wherein the fibers are optical glass fibers and which includes optical cement disposed between the end surfaces of the aligned glass fibers of the first and second group.

3. A connection according to claim 1, wherein the shrinking tube consists of a transparent material so that the position of the end surfaces of the fibers can be observed during forming of the connection.

4. A connection according to claim 1, wherein each end of the carrier member has a conical configuration to minimize breaking of the fibers extending from the connection.

5. A connection according to claim 4, wherein the carrier member comprises a metal body.

6. A connection according to claim 1, wherein the carrier member is a metal body.

7. A connection according to claim 6, wherein one fiber of each of the first and second groups of fibers is an electrical wire, and wherein the remaining fibers of the first and second groups are optical fibers so that an electrical connection is formed between the electrical wire of the first group and the wire of the second group by contact of the wires with the metal body.

8. A device for connecting a first and second group of fibers with each group having the same number of fibers and for holding each fiber in the first group in alignment with a given fiber in the second group, said connecting device comprising a single elongated carrier member having a plurality of longitudinally extending grooves having a shape and dimension so that a portion of the fibers of the first and second groups will be received therein, and a shrinkable tube having an inner diameter slightly larger than the outer diameter of the carrier member, said shrinkable tube being telescopically received on the elongated carrier member and being shrinkable thereon to tightly engage the carrier member and any fibers disposed in the longitudinally extending grooves, so that after insertion of the fibers of the first group from one end of the carrier member with each fiber extending into its respective groove and insertion of the fibers of the second group from the opposite end with each fiber extending into its respective groove and with their end faces of the fibers in each groove in engagement with each other, the shrinkable tube is shrunk into tight engagement on the inserted fibers to hold them in their aligned position in their respective grooves and in a connection.

9. A device according to claim 1, wherein the carrier member is a metal body.

10. A device according to claim 1, wherein the shrinkable tube is a transparent tube.

11. A device according to claim 1, wherein the carrier member has a conical portion at each end.

* * * * *